(12) United States Patent
You et al.

(10) Patent No.: US 8,198,367 B2
(45) Date of Patent: Jun. 12, 2012

(54) THERMOPLASTIC ACRYLONITRILE-BUTADIENE-STYRENE RESIN COMPOSITION WITH EXCELLENT RELEASABILITY AND COLORABILITY

(75) Inventors: Han Jong You, Daejeon (KR); Seong Lyong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 290 days.

(21) Appl. No.: 12/543,618

(22) Filed: Aug. 19, 2009

(65) Prior Publication Data

US 2010/0048798 A1  Feb. 25, 2010

(30) Foreign Application Priority Data

Aug. 19, 2008  (KR) .................. 10-2008-0080697

(51) Int. Cl.
  $C08G\ 63/91$ (2006.01)
  $C08L\ 51/04$ (2006.01)
  $C08L\ 53/00$ (2006.01)
  $C08L\ 55/02$ (2006.01)
  $C08L\ 53/02$ (2006.01)

(52) U.S. Cl. .............. 525/71; 524/504; 525/66; 525/55; 525/70; 526/340; 526/335; 526/341

(58) Field of Classification Search .................. 524/504; 525/71, 66, 55, 70; 526/340, 335, 341
See application file for complete search history.

(56) References Cited

U.S. PATENT DOCUMENTS

| 5,112,895 | A | 5/1992 | Chen et al. | |
| 2008/0167426 | A1 * | 7/2008 | Kim et al. | .................. 525/71 |

FOREIGN PATENT DOCUMENTS

| DE | 19839369 A1 | 4/1999 |
| DE | 19951648 A1 | 5/2001 |
| DE | 112004000633 B4 | 10/2007 |
| KR | 100493459 B1 | 6/2005 |
| KR | 100632208 B1 | 9/2006 |
| KR | 100700683 B1 | 3/2007 |
| KR | 100774820 B1 | 11/2007 |
| KR | 100836572 B1 | 6/2008 |
| KR | 1020090038508 A | 4/2009 |

OTHER PUBLICATIONS

European Search Report issued on Dec. 4, 2009 in connection with corresponding European Appln. No. 09010557.8-2109.

* cited by examiner

*Primary Examiner* — David W Wu
*Assistant Examiner* — Deve E Valdez
(74) *Attorney, Agent, or Firm* — Lerner, David, Littenberg, Krumholz & Mentlik, LLP

(57) ABSTRACT

A thermoplastic acrylonitrile-butadiene-styrene (ABS) resin composition of the present invention comprises (a) a bimodal graft copolymer of a conjugated diene rubbery polymer whose average particle diameter of 800 to 1,500 Å and a conjugated diene rubbery polymer whose average particle diameter of 2,500 to 3,500 Å, the conjugated diene rubbery polymers being grafted with an aromatic vinyl compound and a vinyl cyanide compound, (b) an acrylic resin of a methacrylic or acrylic acid alkyl ester compound, an aromatic vinyl compound and a vinyl cyanide compound, (c) a copolymer of an aromatic vinyl compound and a vinyl cyanide compound, and (d) polysiloxane masterbatches. The ABS resin composition has excellent colorability and releasability while maintaining the inherent physical properties (e.g., impact strength and tensile strength) of the base resin.

9 Claims, No Drawings

THERMOPLASTIC ACRYLONITRILE-BUTADIENE-STYRENE RESIN COMPOSITION WITH EXCELLENT RELEASABILITY AND COLORABILITY

CROSS REFERENCE TO RELATED APPLICATION

The present application claims the benefit of Korean Application No. 10-2008-0080697, filed Aug. 19, 2008, the disclosure of which is hereby incorporated by reference herein.

BACKGROUND OF THE INVENTION

1. Field of the Invention

The present invention relates to a thermoplastic acrylonitrile-butadiene-styrene (ABS) resin composition with excellent release and colorability. More specifically, the present invention relates to a thermoplastic ABS resin composition comprising a base resin and polysiloxane masterbatches as release agents wherein the base resin contains two kinds of grafted conjugated diene rubbery polymers having different rubber sizes and distributions.

2. Description of the Related Art

Acrylonitrile-butadiene-styrene (ABS) resins are typical resins that are highly functional and can be used for general purposes. ABS resins are used in various applications, including automotive parts, electric/electronic components and general merchandise, due to their advantages in terms of impact strength, tensile strength, modulus of elasticity, etc. For use in such applications, ABS resins are generally molded by suitable techniques, such as injection and extrusion molding. In the case where a resin is used as a material for a product requiring high precision dimensions or a product having a complex shape by molding or automatic injection molding of a resin is performed at high speed, the releasability of the resin may greatly affect the productivity and quality of the molded product.

Suitable modification of molding processing conditions can partially solve the problems associated with releasability, and in most cases, it does not provide a satisfactory solution to the releasability problems. Further, even if the problem of poor releasability is satisfactorily solved, the molding cycle time is increased, which leads to low productivity.

In another attempt to solve the problem of poor releasability, the application of a release agent to a mold is suggested. However, in the case of a molded toy product for children, ingredients of the release agent may remain on the molded product and have a bad influence on the safety of children.

In an alternative attempt, a release agent is previously blended with a resin to improve the releasability of the resin. Higher fatty acids and metal salts thereof, polyoxypropylene glycols and silicone oils are known to be suitable for this purpose. However, when the release agent is added in an amount of 0.5 parts by weight or more, a balance in the basic physical properties of the resin may collapse and a portion of the release agent may migrate to the resin surface to contaminate the surfaces of a mold and a molded product or worsen the thermal stability of the resin.

Korean Patent No. 10-0632208 discloses that a silicone release solution containing an epoxy compound and a silane compound is coated on the surface of a polyester film to improve the releasability of the polyester film. This patent is distinguished from the present invention by its application and in that the releasability of the polyester film is improved by the coating of the particular compounds.

Further, Korean Patent No. 10-0493459 discloses that the addition of a resin, such as ABS, LLDPE or HDPE, to a polycarbonate (PC) resin improves the releasability, processability, economic efficiency, chemical resistance, etc. of the PC resin while maintaining the inherent advantages of the PC resin in terms of impact resistance, self-extinguishing properties, dimensional stability and heat resistance. This patent is somewhat distinguished from the present invention in that the releasability of the base resin is improved by the addition of a resin different from the base resin rather than by the addition of an additive.

Thus, there is an urgent need for a thermoplastic ABS resin composition that is prepared by previously adding an additive to a resin to improve the releasability of the resin and achieve good colorability and well-balanced physical properties.

SUMMARY OF THE INVENTION

In view of the foregoing problems of the prior art, an object of the present invention is to provide a thermoplastic acrylonitrile-butadiene-styrene (ABS) resin composition with excellent colorability and releasability.

According to an aspect of the present invention, there is provided a thermoplastic acrylonitrile-butadiene-styrene (ABS) resin composition comprising (a) 25 to 40 parts by weight of a bimodal graft copolymer of a conjugated diene rubbery polymer whose average particle diameter of 800 to 1,500 Å and a conjugated diene rubbery polymer whose average particle diameter of 2,500 to 3,500 Å, the conjugated diene rubbery polymers being grafted with an aromatic vinyl compound and a vinyl cyanide compound, (b) 10 to 45 parts by weight of an acrylic resin of a methacrylic or acrylic acid alkyl ester compound, an aromatic vinyl compound and a vinyl cyanide compound, (c) 50 to 65 parts by weight of a copolymer of an aromatic vinyl compound and a vinyl cyanide compound, and (d) 0.5 to 5 parts by weight of masterbatches containing a polysiloxane whose viscosity is from 1,000,000 to 3,000,000 cSt, based on 100 parts by weight of a base resin composed of (a), (b) and (c).

DETAILED DESCRIPTION OF THE INVENTION

The present invention will now be described in detail.

The present invention provides a thermoplastic acrylonitrile-butadiene-styrene (ABS) resin composition comprising (a) 25 to 40 parts by weight of a bimodal graft copolymer of a conjugated diene rubbery polymer whose average particle diameter of 800 to 1,500 Å and a conjugated diene rubbery polymer whose average particle diameter of 2,500 to 3,500 Å, the conjugated diene rubbery polymers being grafted with an aromatic vinyl compound and a vinyl cyanide compound, (b) 10 to 45 parts by weight of an acrylic resin of a methacrylic or acrylic acid alkyl ester compound, an aromatic vinyl compound and a vinyl cyanide compound, (c) 50 to 65 parts by weight of a copolymer of an aromatic vinyl compound and a vinyl cyanide compound (hereinafter referred to simply as a 'styrene-acrylonitrile (SAN) resin'), and (d) 0.5 to 5 parts by weight of masterbatches containing a polysiloxane whose viscosity is from 1,000,000 to 3,000,000 cSt, based on 100 parts by weight of a base resin composed of (a), (b) and (c).

The thermoplastic resin composition of the present invention exhibits excellent colorability and releasability when compared to acrylonitrile-butadiene-styrene (ABS) resins. Based on these advantages, the thermoplastic resin composition can be applied to the manufacture of a product having a complex shape by molding or to high-speed injection molding. In addition, the thermoplastic resin composition of the present invention can be used as a material for automotive parts, electric/electronic components, toy elements, and the like.

The individual components of the thermoplastic resin composition according to the present invention will be explained below.

(a) Bimodal Graft Copolymer

The graft ABS polymer can be prepared by an emulsion graft copolymerization method.

Specifically, the emulsion graft copolymerization method is carried out by the following steps:

i) 25 to 80 parts by weight of a mixture of two kinds of polybutadiene rubber latexes as conjugated diene rubbery polymers, 5 to 15 parts by weight of an aromatic vinyl compound, 5 to 10 parts by weight of a vinyl cyanide compound, 0.1 to 0.5 parts by weight of an emulsifier and 50 to 80 parts by weight of deionized water are placed in a polymerization reactor. The temperature of the polymerization reactor is raised to 40 to 60° C. A peroxide initiator, an activator promoting the initiation reaction of the initiator and a molecular weight modifier are added to the reactor to initiate the polymerization of the monomers;

ii) 10 to 20 parts by weight of an aromatic vinyl compound, 5 to 15 parts by weight of a vinyl cyanide compound, 0.5 to 1.5 parts by weight of an emulsifier and 20 to 30 parts by weight of deionized water are mixed together to prepare a monomer emulsion. When the conversion of the monomers in the reaction mixture of step i) reaches 50 to 70% after 30 to 60 min from the initiation of the polymerization, the temperature of the polymerization reactor is slowly raised to 60 to 70° C. while successively adding the monomer emulsion to the reaction mixture of step i) for 2 to 3 hr;

iii) A peroxide initiator is added successively to the reaction mixture of step i) for 2 to 3 hr while continuously adding the monomer emulsion of step ii) to the reaction mixture of step i); and iv) A peroxide initiator and an activator promoting the initiation reaction are added batchwise to the mixture of step iii). The temperature of the polymerization reactor is raised to 70 to 80° C. over 1 to 2 hr to prepare the rubber-reinforced thermoplastic resin having a graft rate of 10 to 30%.

The polymerization reaction is carried out for 2 to 7 hr and the polymerization conversion is at least 95%.

Preferably, one of the polybutadiene rubber latexes has an average particle diameter of 800 to 1,500 Å and a gel content of 80 to 90% and is used in an amount of 10 to 40 parts by weight; and the other polybutadiene rubber latex has an average particle diameter of 2,500 to 3,500 Å and a gel content of 80 to 90% and is used in an amount of 15 to 40 parts by weight.

The aromatic vinyl compounds may be styrene, α-methylstyrene, α-ethylstyrene or p-methylstyrene. Styrene is preferred.

The vinyl cyanide compounds may be acrylonitrile, methacrylonitrile or ethacrylonitrile. Acrylonitrile is preferred.

The emulsifiers may be those known in the art. Reactive emulsifiers are preferably used. Specific examples of emulsifiers suitable for use in the present invention include alkyl aryl sulfonates, alkali methyl alkyl sulfates, sulfonated alkyl esters, soaps of fatty acids, and alkali salts of rosin acids, which may be used alone or as a mixture of two or more thereof. It is desirable to use the emulsifiers in an amount of 0.6 to 2.0 parts by weight.

The molecular weight modifier may be a mercaptan compound. Preferably, the molecular weight modifier is tertiary dodecyl mercaptan. It is desirable to use the molecular weight modifier in an amount of 0.1 to 1.0 part by weight.

As the peroxide initiators, there may be used, for example, sodium persulfate, calcium persulfate, cumene hydroperoxide, diisopropylbenzene hydroperoxide, azobisisobutylnitrile, tertiary butyl hydroperoxide, p-methane hydroperoxide, benzoyl peroxide or potassium persulfate.

It is desirable to use the peroxide initiators in an amount of 0.05 to 0.5 parts by weight. The peroxide initiators may be used in different amounts in the respective steps. For example, the peroxide initiator is used in an amount of 30 to 50 parts by weight in step i), the peroxide initiator is used in an amount of 30 to 50 parts by weight in step iii), and the peroxide initiator is used in an amount of 10 to 20 parts by weight in step iv), based on 100 parts by weight of the peroxide initiator.

The activators serve to promote the initiation reaction of the peroxide initiator. The activators may be sodium formaldehyde sulfoxylate, sodium ethylenediamine tetraacetate, ferrous sulfate, dextrose, sodium pyrrolinate, sodium sulfite, or a mixture thereof. A mixture of dextrose, sodium pyrrolinate and ferrous sulfate is preferred. In this case, the dextrose, sodium pyrrolinate and ferrous sulfate are used in amounts of 0.001 to 0.02 parts, 0.001 to 0.02 parts and 0.0001 to 0.002 parts by weight, respectively.

The graft ABS polymer thus prepared may be treated with $H_2SO_4$, $MgSO_4$ or $CaCl_2$ as a coagulant, washed, dehydrated, dried and powdered. It is most preferred to coagulate the graft ABS polymer with $H_2SO_4$ in view of the object of the present invention. The treatment of the graft ABS polymer with the other coagulants may cause deterioration of flowability due to side reactions and deterioration of impact strength or gloss.

The graft ABS polymer may be present in an amount of 25 to 40 parts by weight, based on 100 parts by weight of the base resin. This content range ensures good flowability during processing into products and high impact strength after molding.

(b) Acrylic Resin

The acrylic resin may be prepared by bulk polymerization of a methacrylic or acrylic acid alkyl ester compound, an aromatic vinyl compound and a vinyl cyanide compound.

The methacrylic or acrylic acid alkyl ester compound, the aromatic vinyl compound and the vinyl cyanide compound are used in amounts of 60 to 75% by weight, 20 to 40% by weight and 3 to 30% by weight, respectively.

The methacrylic or acrylic acid alkyl ester compound is preferably selected from the group consisting of methyl acrylate, ethyl acrylate, methyl methacrylate, ethyl methacrylate, methyl ethacrylate, ethyl ethacrylate and mixtures thereof. Methyl methacrylate is more preferred. The methacrylic or acrylic acid alkyl ester compound is preferably used in an amount of 60 to 75% by weight, based on the total weight of the reaction mixture. The use of the methacrylic or acrylic acid alkyl ester compound in an amount of less than 60% by weight causes an increase in refractive index and haze. Meanwhile, the use of the methacrylic or acrylic acid alkyl ester compound in an amount exceeding 75% by weight drastically increases the viscosity of the reaction mixture, which impedes uniform polymerization of the monomers.

The aromatic vinyl compound is preferably selected from the group consisting of styrene, α-methyl styrene, p-methyl styrene and styrenes in which at least hydrogen atom bonded to the benzene nucleus is optionally substituted with a $C_1$-$C_5$ alkyl or halogen. Styrene is more preferred. The aromatic vinyl compound is preferably used in an amount of 20 to 40% by weight, based on the total weight of the reaction mixture. The use of the aromatic vinyl compound in an amount of less than 20% by weight increases the viscosity of the reaction mixture and results in poor processability and flowability of finished products. Meanwhile, the use of the aromatic vinyl compound in an amount of more than 40% by weight causes an increase in refractive index, resulting in poor transparency.

The vinyl cyanide compound is preferably selected from the group consisting of acrylonitrile, methacrylonitrile, ethacrylonitrile, and mixtures thereof. Acrylonitrile is more preferred. The vinyl cyanide compound is preferably used in an amount of 3 to 30% by weight. The use of the vinyl cyanide compound in an amount of less than 3% by weight results in a marked decrease in chemical resistance, and the use of the vinyl cyanide compound in an amount of more than 30% by weight unfavorably causes severe heat discoloration.

A preferable reaction medium for the polymerization reaction is an aromatic hydrocarbon compound optionally substituted with at least one $C_1$-$C_3$ alkyl or halogen group. More preferably, the reaction medium is selected from the group consisting of ethylbenzene, toluene and xylene. The amount of the reaction medium used is preferably from 20 to 30 parts by weight, based on 100 parts by weight of the reaction mixture. The use of the reaction medium in an amount of less than 20 parts by weight drastically increases the viscosity of the reaction mixture, and the use of the reaction medium in an amount of more than 30 parts by weight unfavorably lowers the molecular weight and productivity of the acrylic resin. The reaction medium serves as a reaction lubricant rather than as a reaction solvent.

An antioxidant, a molecular weight modifier and an organic peroxide initiator may be added during polymerization of the reaction mixture.

The antioxidant serves to inhibit the reaction mixture from yellowing in an evaporation bath at high temperature.

As the antioxidant, a hindered phenolic antioxidant or a mixture thereof with a phosphite antioxidant may be used. The antioxidant is preferably used in an amount of 0.01 to 1.0 part by weight, based on 100 parts by weight of the reaction mixture. If the antioxidant is used in an amount of less than 0.01 parts by weight, the inhibitory effect on yellowing due to thermal hysteresis in an evaporation bath at high temperature is insignificant. Meanwhile, if the antioxidant is used in an amount of more than 1.0 part by weight, the conversion of the monomers is low, resulting in an increase in refractive index.

The phenolic antioxidant is preferably selected from the group consisting of tetrakismethylene 3-(3,5-di-tert-butyl-4-hydroxyphenyl)propionate methane, 1,3,5-tris-(4-t-butyl-3-hydroxy-2,6-dimethylbenzyl)-1,3,5-triazine-2,4,6-(1H,3H,5H)-trione and 1,3,5-tris-(3,5-di-t-butyl-4-hydroxybenzyl)-s-triazine-2,4,6-(1H,3H,5H)-trione. The phosphite antioxidant is preferably selected from the group consisting of tris(2,4-t-butyl phenyl)phosphite and tris-(nonylphenyl) phosphite.

The mixing ratio of the phenolic antioxidant to the phosphite antioxidant is preferably from 9:1 to 1:5, more preferably from 5:1 to 1:3, and most preferably from 2:1 to 1:2. If the amount of the phosphite antioxidant used is more than the upper limit (i.e. 1:5), the reaction mixture may undergo thermal hysteresis during polymerization. Meanwhile, if the amount of the phosphite antioxidant used is less than the lower limit (i.e. 9:1), the reaction mixture may undergo thermal hysteresis in an evaporation bath and during subsequent processing.

The molecular weight modifier plays a role in adjusting the molecular weight of the acrylonitrile-styrene-acrylate (ASA) resin to an appropriate level in order to prevent a drastic increase in viscosity during bulk polymerization. The molecular weight modifier is preferably used in an amount of 0.01 to 1.0 part by weight, based on 100 parts by weight of the monomer mixture. The use of the molecular weight modifier in an amount of less than 0.01 parts by weight makes the reaction mixture viscous, causing difficulty in operating during subsequent processing. Meanwhile, the use of the molecular weight modifier in an amount of more than 1.0 part by weight lowers the molecular weight of the ASA resin, resulting in low impact strength. The molecular weight modifier is preferably selected from the group consisting of t-dodecyl mercaptan, n-octyl mercaptan, and mixtures thereof.

The organic peroxide initiator plays a role in initiating the polymerization for the preparation of the ASA resin. The organic peroxide initiator is preferably used in an amount of 0.01 to 0.1 parts by weight, based on 100 parts by weight of the monomer mixture. The use of the organic peroxide initiator in an amount of less than 0.01 parts by weight results in low productivity and causes severe heat discoloration due to a difference in the composition of the polymer. Meanwhile, the use of the organic peroxide initiator in an amount exceeding 0.1 parts by weight causes extremely rapid polymerization of the monomers, making it very difficult to control the reaction pressure and heat, and results in a marked increase in the viscosity of the reaction mixture due to the gel effect. The organic peroxide initiator is preferably selected from the group consisting of 1,1-bis(t-butylperoxy)-3,3,5-trimethylcyclohexane, 1,1-bis(t-butylperoxy)cyclohexane, 1,1-bis(t-butylperoxy)-2-methylcyclohexane, and mixtures thereof.

It is not necessary to add these additives to the reaction mixture after mixing of the monomers. For example, the additives and the monomers may be added to the reactor all at one time. No limitation is imposed on the addition order of the additives and the monomers.

The acrylic resin is preferably used in an amount of 10 to 45% by weight, based on the total weight of the base resin. The use of the acrylic resin in an amount of less than 10% by weight causes poor colorability of the ABS resin composition, while the use of the acrylic resin in an amount of more than 45% by weight increases the specific gravity of the ABS resin composition and makes the price of the ABS resin composition more expensive.

(c) SAN Resin

The SAN resin can be prepared by continuous bulk polymerization of 30 to 90 parts by weight of an aromatic vinyl compound and 10 to 70 parts by weight of a vinyl cyanide compound. The SAN resin is preferably used in an amount of 50 to 65 parts by weight, based on 100 parts by weight of the base resin. The use of the SAN resin in an amount of less than 50 parts by weight causes poor flowability and processability of the ABS resin composition, while the use of the SAN resin in an amount exceeding 65 parts by weight causes poor mechanical properties, such as impact strength and tensile strength, of the ABS resin composition.

(d) Polysiloxane Masterbatches

The polysiloxane masterbatches are characterized in that 25 to 50% by weight of an ultrahigh molecular weight polysiloxane is dispersed in a resin. The polysiloxane masterbatches are essentially composed of polydimethylsiloxane, polydiphenylsiloxane or a combination thereof. The polysiloxane has a viscosity of 1,000,000 to cSt. The polysiloxane masterbatches are preferably present in an amount of 0.5 to 5 parts by weight, based on 100 parts by weight of the base resin. The use of the polysiloxane masterbatches in an amount of less than 0.5 parts by weight results in little improvement in the releasability of the ABS resin composition. Meanwhile, the use of the polysiloxane masterbatches in an amount of more than 5 parts by weight deteriorates the elongation and stiffness of the ABS resin composition.

The thermoplastic resin composition of the present invention may further comprise at least one additive commonly used in the art, for example, a lubricant, an antioxidant or a UV stabilizer, according to the intended application.

As the lubricant, there may be used ethylene bisstearamide, oxidized polyethylene wax, magnesium stearate or a combination thereof. The lubricant is preferably used in an amount of 0.1 to 6 parts by weight and more preferably 0.5 to 4 parts by weight, based on 100 parts by weight of the base resin composed of (a), (b) and (c) and the release agent (d).

As the antioxidant, there may be used, for example, Irganox 1076, Irganox PS 800 or Wingstay L. The antioxidant is preferably used in an amount of 0.2 to 2 parts by weight and more preferably 0.5 to 1.0 part by weight, based on 100 parts by weight of the base resin composed of (a), (b) and (c) and the release agent (d).

The UV stabilizer may be an UV absorber, such as TINUVIN P. The UV stabilizer is preferably used in an amount of 0.05 to 3 parts by weight and more preferably 0.2 to 1.0 part by weight, based on 100 parts by weight of the base resin composed of (a), (b) and (c) and the release agent (d).

The thermoplastic resin composition of the present invention is suitable for use as a material for a product having a complex shape or a high-speed injection molded product due to its excellent colorability and releasability. For example, the thermoplastic resin composition of the present invention can be used as a material for an automotive part, an electric/electronic component or a toy element.

The following examples are provided to assist in a further understanding of the invention. However, these examples are intended for illustrative purposes only and are not meant in any way to restrict the scope of the invention.

EXAMPLES

Example 1

(a) Bimodal Graft Copolymer i) 25 parts by weight of a polybutadiene rubber latex having an average particle diameter of 1,000 Å and a gel content of 90%, 30 parts by weight of a polybutadiene rubber latex having an average particle diameter of 3,000 Å and a gel content of 90%, 10 parts by weight of styrene, 10 parts by weight of acrylonitrile, 0.5 parts by weight of potassium rosinate and 75 parts by weight of deionized water were placed in a polymerization reactor. The polymerization reactor was heated to 50° C. 0.1 parts by weight of tertiary butyl hydroperoxide, 0.001 parts by weight of dextrose and 0.3 parts by weight of tertiary dodecyl mercaptan were added to the reactor to initiate the polymerization of the monomers.

ii) 15 parts by weight of styrene, 10 parts by weight of acrylonitrile, 1.0 part by weight of potassium rosinate and 20 parts by weight of deionized water were mixed together to prepare a monomer emulsion. When the conversion of the monomers in the reaction mixture of i) reached 60% after 30 min from the initiation of the polymerization, the temperature of the polymerization reactor was slowly raised to 60° C. while successively adding the monomer emulsion to the reaction mixture of i) for 2 hr.

iii) 0.1 parts by weight of t-butyl hydroperoxide was added successively to the reaction mixture of i) for 2 hr while continuously adding the monomer emulsion of ii) to the reaction mixture of i).

iv) 0.05 parts by weight of cumyl hydroperoxide, 0.001 parts by weight of dextrose and 0.002 parts by weight of ferrous sulfate were added batchwise to the mixture of iii). The polymerization reactor was heated to 75° C. over 2 hr to give a graft ABS polymer.

The graft ABS polymer was coagulated with sulfuric acid.

(b) Preparation of Acrylic Resin

25% by weight of styrene, 40% by weight of methyl methacrylate and 15% by weight of acrylonitrile were mixed together. To 100 parts by weight of the mixture were added 20 parts by weight of toluene, 0.02 parts by weight of 1,1-bis(t-butylperoxy)-3,3,5-trimethylcyclohexane, 0.08 parts by weight of n-dodecyl mercaptan and 0.1 parts by weight of 1,3,5-tris(4-tert-butyl-3-hydroxy-2,6-dimethylbenzyl)-1,3,5-triazine-2,4,6-(1H,3H,5H)-trione. The resulting mixture was added at a rate of 14 L/hr to a 26 L reactor. The reaction mixture was polymerized in a first reactor at 140° C. and in a second reactor at 150° C. When the polymerization conversion reached about 60% or higher, unreacted monomers and the reaction medium were removed in an evaporation bath at 215° C., giving a transparent copolymer in the form of a pellet.

(c) Preparation of SAN Resin

A styrene-acrylonitrile resin (81HF, LG Chem. Ltd., Korea) was used without further purification.

(d) Polysiloxane Masterbatches

Polysiloxane masterbatches (MB50-007, Dow Corning) were used without further purification. In the polysiloxane masterbatches, 50% by weight of an ultrahigh molecular weight polysiloxane having a viscosity of 1,000,000 to 3,000,000 cSt was dispersed in an ABS resin.

Preparation of Thermoplastic Resin Composition

One part by weight of the polysiloxane masterbatches (d) was added to a base resin composed of 30 parts by weight of the bimodal graft copolymer (a), 15 parts by weight of the acrylic resin (b) and 55 parts by weight of the SAN resin (c). 4 parts by weight of ethylene bisstearamide (EBA) as a lubricant, 0.3 parts by weight of Wingstay-L as an antioxidant and 0.1 parts by weight of TINUVIN P as a UV stabilizer were added to 100 parts by weight of the base resin composed of (a), (b), (c) and the masterbatches (d). The mixture was pelletized using a twin-screw extruder at 230° C.

Example 2

The procedure of Example 1 was repeated except that the acrylic resin (b) and the SAN resin (c) were used in amounts of 25 parts and 45 parts by weight, respectively, to prepare a thermoplastic resin composition.

Example 3

The procedure of Example 1 was repeated except that the acrylic resin (b) and the SAN resin (c) were used in amounts of 35 parts and 35 parts by weight, respectively, to prepare a thermoplastic resin composition.

Comparative Example 1

The procedure of Example 1 was repeated except that the bimodal graft copolymer (a) and the SAN resin (c) were used in amounts of 20 parts and 65 parts by weight, respectively, to prepare a thermoplastic resin composition.

Comparative Example 2

The procedure of Example 1 was repeated except that the acrylic resin (b) and the SAN resin (c) were used in amounts of 25 parts and 45 parts by weight, respectively, to prepare a thermoplastic resin composition.

Comparative Example 3

The procedure of Example 1 was repeated except that 1.0 part by weight of PE wax (LC-102N, Lyon Chem.) was used instead of the polysiloxane masterbatches (c) to prepare a thermoplastic resin composition.

Test Example 1

The pellets produced in Examples 1-3 and Comparative Examples 1-3 were tested for clutch work, elongation at break and impact strength in accordance with the following methods. The results are shown in Table 1.

Clutch Work

The clutch work of a resin is a measure of the releasability of the resin and means a force required for coupling and decoupling Lego bricks. A higher clutch work means that a larger force is needed to decouple bricks. This measurement was made according to the specification of the Lego Group.

Impact Weldline Strength

The impact weldline strength was measured using a bar type specimen (50 mm×6 mm×4 mm) formed with weldlines in a Lego mold according to the method of DIN 51222.

Colors

The colors were measured using a calorimeter under D65 conditions.

TABLE 1

|  |  | Example No. | | | Comparative Example No. | | |
|---|---|---|---|---|---|---|---|
|  |  | 1 | 2 | 3 | 1 | 2 | 3 |
| Composition | (a) Bimodal graft copolymer | 30 | 30 | 30 | 20 | 30 | 30 |
|  | (b) Acrylic resin | 15 | 25 | 35 | 15 | 5 | 15 |
|  | (c) SAN resin | 55 | 45 | 35 | 65 | 65 | 55 |
|  | (d) Polysiloxane masterbatches | 1.0 | 1.0 | 1.0 | 1.0 | 1.0 |  |
|  | PE wax |  |  |  |  |  | 1.0 |
| Physical properties | Clutch work | 12.1 | 12.4 | 12.6 | 14.3 | 11.9 | 20.2 |
|  | Weldline strength | 14.5 | 13.3 | 12.1 | 8.9 | 15.2 | 11.9 |
| Colors | L value | 73.1 | 72.7 | 71.3 | 72.9 | 73.7 | 71.5 |
|  | a value | −3.1 | −3.2 | −3.3 | −2.9 | −3.0 | −2.9 |
|  | b value | −0.7 | −1.1 | −1.5 | −0.2 | 0.8 | −0.9 |

As can be known from the results in Table 1, the composition of Example 1 showed higher impact resistance and lower clutch work, indicating better releasability, and had a better b value in color than the composition of Comparative Example 1 comprising a smaller amount of the bimodal graft copolymer.

Further, the composition of Comparative Example 2 comprising a smaller amount of the acrylic resin had higher L and b values in color than the composition of Example 2, indicating that the composition of Comparative Example 2 had inferior colorability to the composition of Example 2.

Further, desired releasability was more difficult to achieve in the composition of Comparative Example 3 using PE wax instead of polysiloxane masterbatches than in the composition of Example 3 using polysiloxane masterbatches.

As is apparent from the foregoing, the thermoplastic ABS resin composition of the present invention has excellent colorability and releasability while maintaining the inherent physical properties (e.g., impact strength and tensile strength) of the base resin.

While the present invention has been described in detail with reference to specific embodiments, those skilled in the art will appreciate that various modifications and variations can be made in the present invention without departing from the spirit and scope of the invention. It is to be understood that such modifications and variations are within the scope of the appended claims.

What is claimed is:

1. A thermoplastic acrylonitrile-butadiene-styrene (ABS) resin composition comprising
    (a) 25 to 40 parts by weight of a bimodal graft copolymer of a conjugated diene rubbery polymer whose average particle diameter is from 800 to 1,500 Å and a conjugated diene rubbery polymer whose average particle diameter is from 2,500 to 3,500 Å, the conjugated diene rubbery polymers being grafted with an aromatic vinyl compound and a vinyl cyanide compound based on 100 parts by weight of a base resin composed of (a), (b) and (c),
    (b) 10 to 45 parts by weight of an acrylic resin of a methacrylic or acrylic acid alkyl ester compound, an aromatic vinyl compound and a vinyl cyanide compound based on 100 parts by weight of a base resin composed of (a), (b) and (c),
    (c) 50 to 65 parts by weight of a copolymer of an aromatic vinyl compound and a vinyl cyanide compound based on 100 parts by weight of a base resin composed of (a), (b) and (c), and
    (d) 0.5 to 5 parts by weight of masterbatches containing a polysiloxane whose viscosity is from 1,000,000 to 3,000,000 cSt, based on 100 parts by weight of a base resin composed of (a), (b) and (c).

2. The ABS resin composition of claim 1, wherein the graft copolymer (a) has a graft rate of 10 to 30%.

3. The ABS resin composition of claim 1, wherein the acrylic resin (b) includes 60 to 75% by weight of the methacrylic or acrylic acid alkyl ester compound, 20 to 40% by weight of the aromatic vinyl compound, and 3 to 30% by weight of the vinyl cyanide compound.

4. The ABS resin composition of claim 1, wherein the copolymer (c) is prepared by polymerization of 30% to 90% by weight of the aromatic vinyl compound and 10% to 70% by weight of the vinyl cyanide compound.

5. The ABS resin composition of claim 1, wherein the aromatic vinyl compounds of the graft copolymer (a), the acrylic resin (b) and the copolymer (c) are selected from the group consisting of styrene, α-methylstyrene, p-methylstyrene, o-ethylstyrene, p-ethylstyrene, vinyltoluene and mixtures thereof.

6. The ABS resin composition of claim 1, wherein the vinyl cyanide compounds of the graft copolymer (a), the acrylic resin (b) and the copolymer (c) are selected from the group consisting of acrylonitrile, methacrylonitrile, ethacrylonitrile, and mixtures thereof.

7. The ABS resin composition of claim 1, wherein the polysiloxane masterbatches (d) contain 25 to 50% by weight of polydimethylsiloxane, polydiphenylsiloxane or a combination thereof.

8. The ABS resin composition of claim 1, further comprising 0.1 to 6 parts by weight of a lubricant, 0.2 to 2 parts by weight of an antioxidant or 0.05 to 3 parts by weight of a UV stabilizer, based on 100 parts by weight of the graft copolymer (a), the acrylic resin (b), the copolymer (c) and the polysiloxane masterbatches (d).

9. A material for an automotive part, an electric/electronic component or a toy element wherein the material comprises the ABS resin composition of claim 1.

* * * * *